United States Patent
Wu et al.

(10) Patent No.: US 10,717,815 B2
(45) Date of Patent: Jul. 21, 2020

(54) POLYMER COMPOSITIONS BASED ON A BIO-SOURCED POLYARYLENE ETHER KETONE

(71) Applicant: SOLVAY SPECIALTY POLYMERS USA, LLC, Alpharetta, GA (US)

(72) Inventors: Yuhong Wu, Flushing, NY (US); Narmandakh Taylor, Cumming, GA (US); Vito Leo, Glimes (BE)

(73) Assignee: SOLVAY SPECIALTY POLYMERS USA, L.L.C., Alpharetta, GA (US)

( * ) Notice: Subject to any disclaimer, the term of this patent is extended or adjusted under 35 U.S.C. 154(b) by 4 days.

(21) Appl. No.: 15/569,561

(22) PCT Filed: Apr. 20, 2016

(86) PCT No.: PCT/EP2016/058758
§ 371 (c)(1),
(2) Date: Oct. 26, 2017

(87) PCT Pub. No.: WO2016/173902
PCT Pub. Date: Nov. 3, 2016

(65) Prior Publication Data
US 2018/0312635 A1 Nov. 1, 2018

Related U.S. Application Data

(60) Provisional application No. 62/154,986, filed on Apr. 30, 2015.

(30) Foreign Application Priority Data

Oct. 16, 2015 (EP) .................................... 15190071

(51) Int. Cl.
| | |
|---|---|
| *C08G 65/40* | (2006.01) |
| *C08L 71/00* | (2006.01) |
| *C08L 71/08* | (2006.01) |
| *C08G 65/00* | (2006.01) |
| *C08J 5/00* | (2006.01) |
| *C08J 5/18* | (2006.01) |
| *C08L 79/08* | (2006.01) |
| *C08L 81/06* | (2006.01) |
| *C09D 165/00* | (2006.01) |
| *C09D 179/08* | (2006.01) |
| *C09D 181/06* | (2006.01) |

(52) U.S. Cl.
CPC .......... *C08G 65/405* (2013.01); *C08G 65/00* (2013.01); *C08G 65/40* (2013.01); *C08G 65/4012* (2013.01); *C08J 5/00* (2013.01); *C08J 5/18* (2013.01); *C08L 71/00* (2013.01); *C08L 71/08* (2013.01); *C08L 79/08* (2013.01); *C08L 81/06* (2013.01); *C09D 165/00* (2013.01); *C09D 179/08* (2013.01); *C09D 181/06* (2013.01); *C08G 2650/40* (2013.01); *C08J 2365/00* (2013.01); *C08J 2379/08* (2013.01); *C08J 2381/06* (2013.01); *C08J 2465/00* (2013.01); *C08J 2479/08* (2013.01); *C08J 2481/06* (2013.01)

(58) Field of Classification Search
None
See application file for complete search history.

(56) References Cited

U.S. PATENT DOCUMENTS

| | | | |
|---|---|---|---|
| 3,847,867 A | 11/1974 | Heath et al. | |
| 2014/0186624 A1* | 7/2014 | Sriram | C09D 171/00 428/398 |
| 2015/0259531 A1* | 9/2015 | El-Hibri | C08L 71/00 524/540 |
| 2017/0362379 A1* | 12/2017 | El-Hibri | C09D 171/08 |

FOREIGN PATENT DOCUMENTS

| | | |
|---|---|---|
| EP | 2738219 A1 | 6/2014 |
| EP | 2899231 A1 | 7/2015 |
| WO | 8303417 A1 | 10/1983 |
| WO | 0060009 A1 | 10/2000 |
| WO | 2013023997 A1 | 2/2013 |
| WO | 2014095794 A2 | 6/2014 |
| WO | 2014202673 A1 | 12/2014 |

* cited by examiner

Primary Examiner — Ana L. Woodward

(57) ABSTRACT

A polymer composition [composition (C)] comprising: (a) a polyarylene ether ketone (PAEK-1) comprising recurring units deriving from the incorporation of 1,4:3,6-dianhydrohexitols; (b) a poly(biphenyl ether) sulfone (PPSU-1) comprising repeating units of formula (I) and/or (c) a polyetherimide (PEI-1) comprising repeating units of formula (II) wherein Ar* and Ar*' are as defined in the specification are herein disclosed. (PAEK-1) and (PPSU-1) and/or (PEI-1) are completely miscible and give rise to compositions that are transparent and possess high strength and stiffness and that are suitable for the manufacture of a variety of shaped articles.

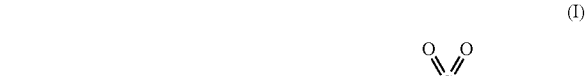

(I)

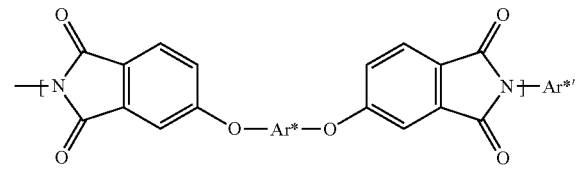

(II)

14 Claims, No Drawings

POLYMER COMPOSITIONS BASED ON A BIO-SOURCED POLYARYLENE ETHER KETONE

This application claims priority to U.S. provisional application No. 62/154,986, filed Apr. 30, 2015 and European patent application n. 15190071.9, filed Oct. 16, 2015, the whole content of these applications being incorporated herein by reference for all purposes.

TECHNICAL FIELD

The present invention relates to polymer compositions comprising a bio-sourced polymer and a poly(biphenyl ether)sulfone and/or a polyetherimide, to methods for their manufacture and to their use in the manufacture of shaped articles.

BACKGROUND

Poly(aryl ether) sulfones, in particular poly(biphenyl ether) sulfones (PPSU), that comprise recurring units of formula (1):

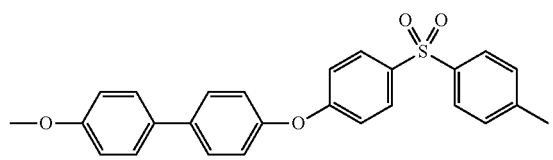

(1)

are used in a number of industrial applications, including, but not limited to, the manufacture of coatings, packaging and articles for medical applications. In such applications it is often desirable to have a good combination of mechanical properties, in particular high strength and stiffness, and transparency. Although PPSU with desirably high mechanical performances are commercially available on the market, there is still the need for improving transparency.

Polyetherimides (PEI) that comprise recurring units of formula (2):

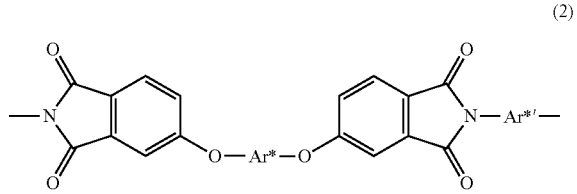

(2)

wherein Ar* and Ar*' independently represent substituted or unsubstituted divalent aromatic radicals and blends thereof are also used in the industry. For example, certain blends of a PEI and a polysulfone (PSU) may be suitable for the manufacture of films, molding compounds, coatings etc. For example, in the blends disclosed in WO 83/03417 (GENERAL ELECTRIC COMPANY US) Oct. 13, 1983, the PSU is defined as a polymeric compound having a —SO$_2$— connecting link between two aryl nuclei and is characterised by the structural formula:

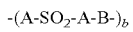

wherein A and B are aryl nuclei, or B is either a single bond or also —SO$_2$— and b is the degree of polymerization (generally a positive integer higher than 5) (page 4, lines 5-14). Specific examples of PSU therein mentioned are those comprising the following recurring unit (3):

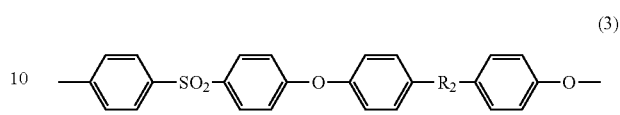

(3)

wherein R$_2$ is C$_1$-C$_6$ alkylene, preferably dimethyl methylene, and b is as defined above and also those comprising the following recurring units (4) and (5):

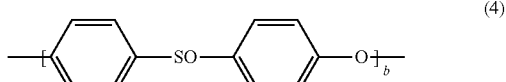

(4)

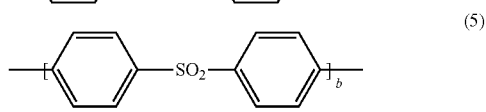

(5)

Compositions comprising a PPSU and a PEI can be used in fabricating appearance parts for aircraft interiors. Suitable PPSU for this purpose, as disclosed in WO 00/60009 (BP AMOCO CORPORATION) Oct. 12, 2000 comprises structural units of formula (1) as defined above and, optionally, a structural unit of formula (6):

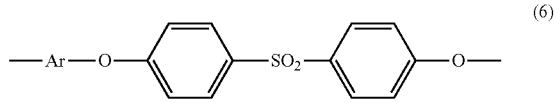

(6)

wherein Ar is a monoarylene moiety.

DESCRIPTION OF THE INVENTION

The Applicant has now surprisingly found out that poly(biphenyl ether) sulfones (PPSU) and/or polyetherimides (PEI) are completely miscible with polyarylene ether ketones (PAEK) comprising recurring units deriving from the incorporation of 1,4:3,6-dianhydrohexitols and that the mixtures (or blends) are transparent while retaining high strength and stiffness.

Polyarylene ether ketones (PAEK) comprising recurring units deriving from the incorporation of the 1,4:3,6-dianhydrohexitols known as isosorbide, isomannide and isoidide having respectively formulae (7)-(9) illustrated below:

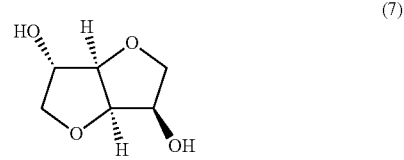

(7)

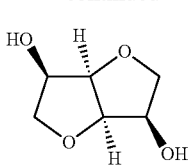
(8)

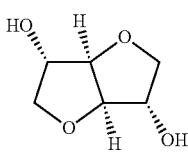
(9)

are described in WO 2013/023997 (SOLVAY SPECIALTY POLYMERS USA) Fe. 21, 2013.

Accordingly, the present invention relates to a composition [herein after "composition (C)"] comprising:
(a) a PAEK comprising recurring units deriving from the incorporation of 1,4:3,6-dianhydrohexitols and
(b) a PPSU and/or
(c) a PEI.

In a first embodiment, the invention relates to a composition [herein after "composition (C-1)"] comprising:
(a1) a PAEK comprising recurring units deriving from the incorporation of 1,4:3,6-dianhydrohexitols and
(b1) a PPSU.

In second embodiment, the invention the relates to a composition [herein after "composition (0-2)"] comprising:
(a2) a PAEK comprising recurring units deriving from the incorporation of 1,4:3,6-dianhydrohexitols and
(c2) a PEI.

In a third embodiment, the invention relates to a composition [herein after "composition (0-3)"] comprising:
(a3) a PAEK comprising recurring units deriving from the incorporation of 1,4:3,6-dianhydrohexitols and
(b3) a PPSU and
(c3) a PEI.

The invention further relates to methods for the manufacture of composition (C) and to the use of composition (C) for the manufacture of shaped articles.

For the sake of clarity, in the following description:
- any reference to composition (C) is intended to include compositions (C-1)-(C-3), unless indicated otherwise;
- likewise, any reference to general formulae of PAEK, PPSU and PEI is intended to include each specific formula falling within the respective general formula, unless indicated otherwise;
- the indeterminate article "a" in the expressions like "a PAEK . . . ", "a PPSU", "a PEI", etc. . . . is intended to mean "one or more", unless indicated otherwise;
- the use of brackets "( )" before and after names, symbols or numbers identifying formulae or parts of formulae, e.g. composition (C), recurring unit ($R_a$), etc. . . . , has the mere purpose of better distinguishing that name, symbol or number from the rest of the text; thus, said parentheses could also be omitted;
- when numerical ranges are indicated, range ends are included;
- the term "halogen" includes fluorine, chlorine and bromine, unless indicated otherwise;
- the adjective "aromatic" or "aryl" denotes any mono- or polycyclic moiety having a number of 7 electrons equal to 4n+2, wherein n is 0 or any positive integer;
- the term "method" is to be regarded as a synonym of "process" and vice versa.

Polyarylene Ether Ketones (PAEK)

For the purposes of the present invention, a PAEK comprising recurring units deriving from the incorporation of 1,4:3,6-dianhydrohexitols (herein after "PAEK-1") is a polymer comprising recurring units of formula ($R_a$):

formula ($R_a$)

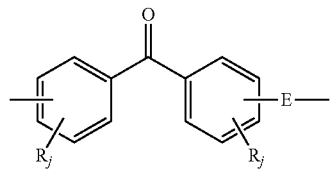

wherein:
E is selected from the group consisting of:

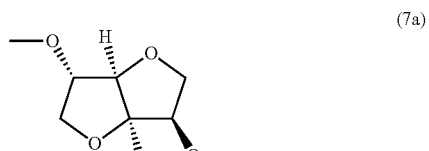
(7a)

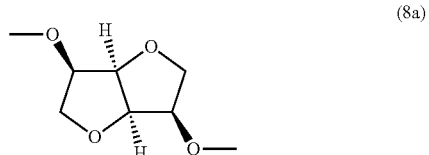
(8a)

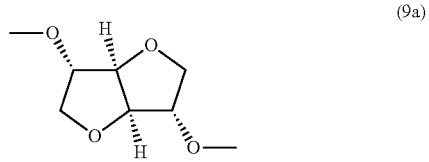
(9a)

each of R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j is zero or is an integer from 1 to 4.

(PAEK-1) used in composition (C) has a weight average molecular weight of at least 10,000. This high molecular weight provides a unique combination of properties, both deriving from the incorporation of bio-based moieties from 1,4:3,6-dianhydrohexitols, like, notably, high Tg, stiffness, biocompatibility, hydrophilicity and from the high molecular weight aryl ketone moieties, ensuring thermal stability, high stiffness and strength, and good toughness.

In recurring unit ($R_a$), the respective phenylene moieties may independently have 1,2-, 1,4- or 1,3-linkages to the other moieties different from R in the recurring unit. Preferably, said phenylene moieties have 1,3- or 1,4-linkages, more preferably they have 1,4-linkages.

Still, in recurring units ($R_a$), j is at each occurrence zero, that is to say that the phenylene moieties have no other substituents than those enabling linkages in the main chain of the polymer.

Most preferably, recurring units ($R_a$) are independently selected from the group consisting of:

units of formula ($R_2$-1):

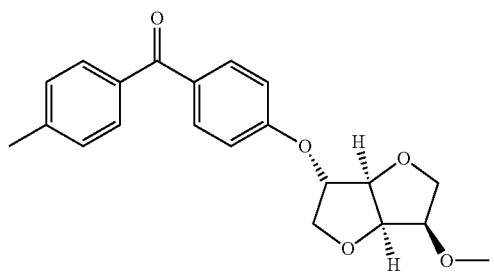
(R$_a$-1)

units of formula ($R_a$-2):

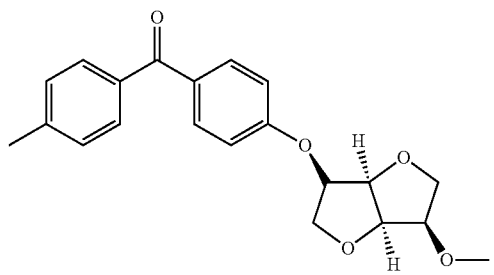
(R$_a$-2)

units of formula ($R_a$-3):

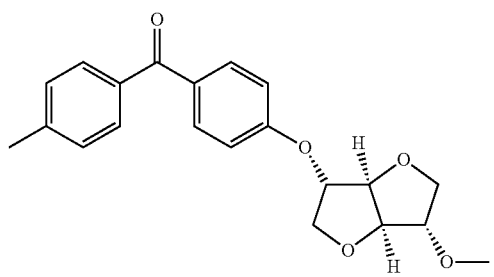
(R$_a$-3)

The above recurring units ($R_a$-1), ($R_a$-2), ($R_a$-3) can be each present alone or in admixture. Preferred are polymers (PAEK-1) comprising recurring units ($R_a$) of formula ($R_a$-1), optionally in combination with recurring units of formula ($R_a$-2) and ($R_a$-3).

Polymer (PAEK-1) may comprise in addition to recurring units of formula ($R_a$) as above detailed, recurring units different from ($R_a$): in other words, in addition to units derived from polycondensation of a dihaloketo compound of formula (dihalo AA):

formula (dihalo AA)

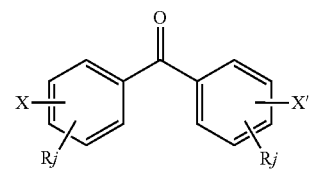

wherein X and X', equal to or different from each other, are halogens, and R and j have the meanings as above detailed, and of a 1,4:3,6-dianhydrohexitol, polymer (PAEK-1) may notably comprise recurring units derived from the polycondensation of one or more diols different from the 1,4:3,6-dianhydrohexitols and/or from the polycondensation of one or more dihaloaryl compound different from the above mentioned dihaloketo compound of formula dihalo (AA).

According to certain embodiments, polymer (PAEK-1) can thus comprise, in addition to recurring units ($R_a$), as above detailed, recurring units ($R_b$) comprising a Ar—C(O)—Ar' group, wherein Ar and Ar', equal to or different from each other, are aromatic groups, said recurring units ($R_b$) being generally selected from the group consisting of formulae (J-A) to (J-O) illustrated below:

(J-A)

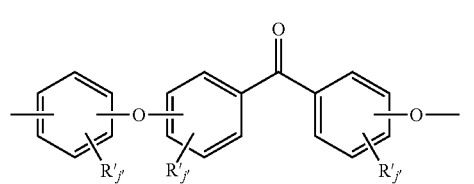

(J-B)

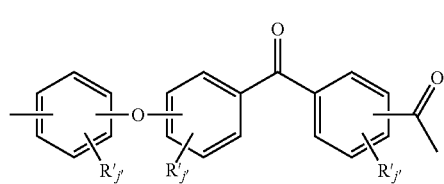

(J-C)

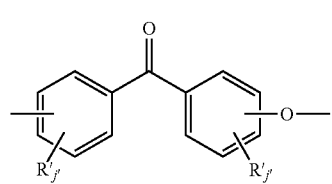

(J-D)

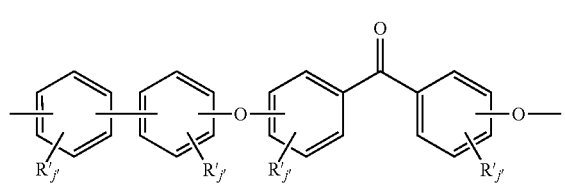

(J-E)
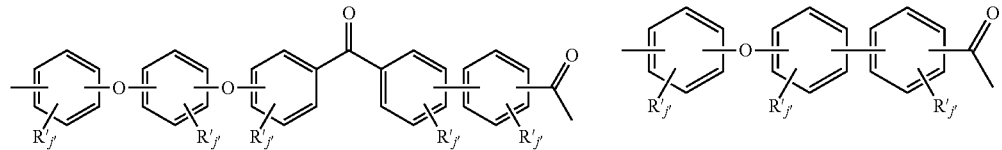
(J-F)
(J-G)
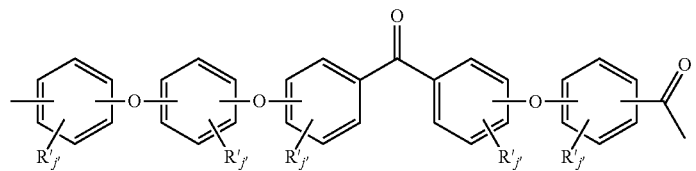
(J-H)
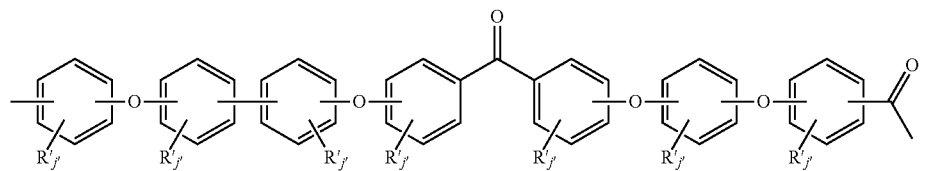
(J-I)
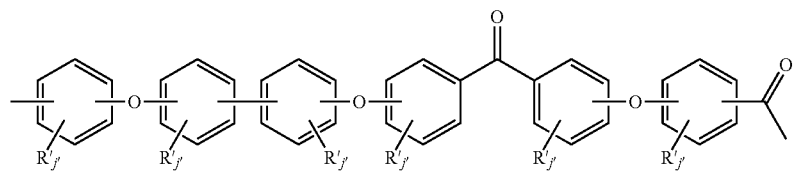
(J-J)
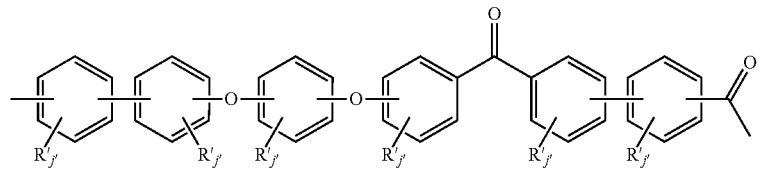
(J-K)
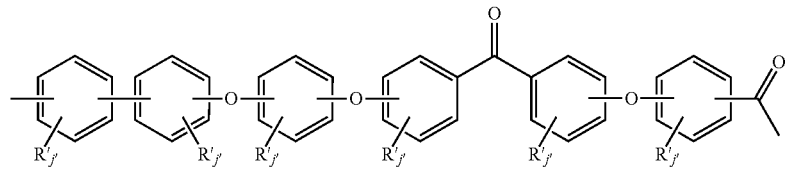
(J-L)
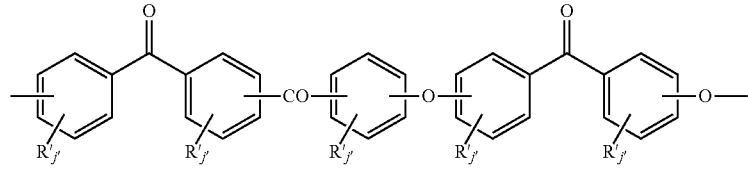
(J-M)
(J-N)
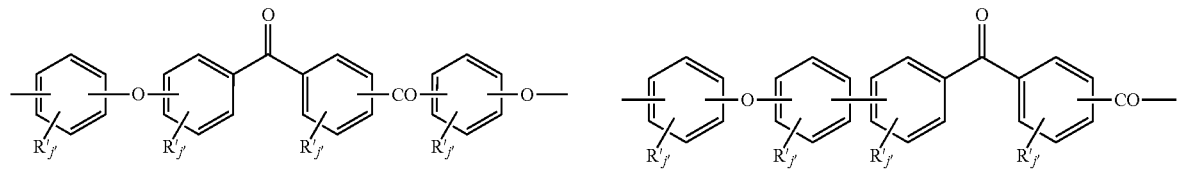

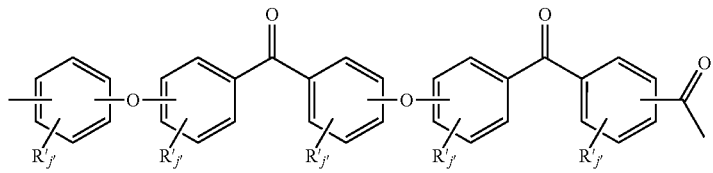
(J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

In recurring units ($R_b$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkages.

Still, in recurring units ($R_b$), j' is at each occurrence zero, that is to say that the phenylene moieties have no other substituents than those enabling linkages in the main chain of the polymer.

Preferred recurring units ($R_b$) are thus selected from those of formulae (J'-A) to (J'-O) herein below:

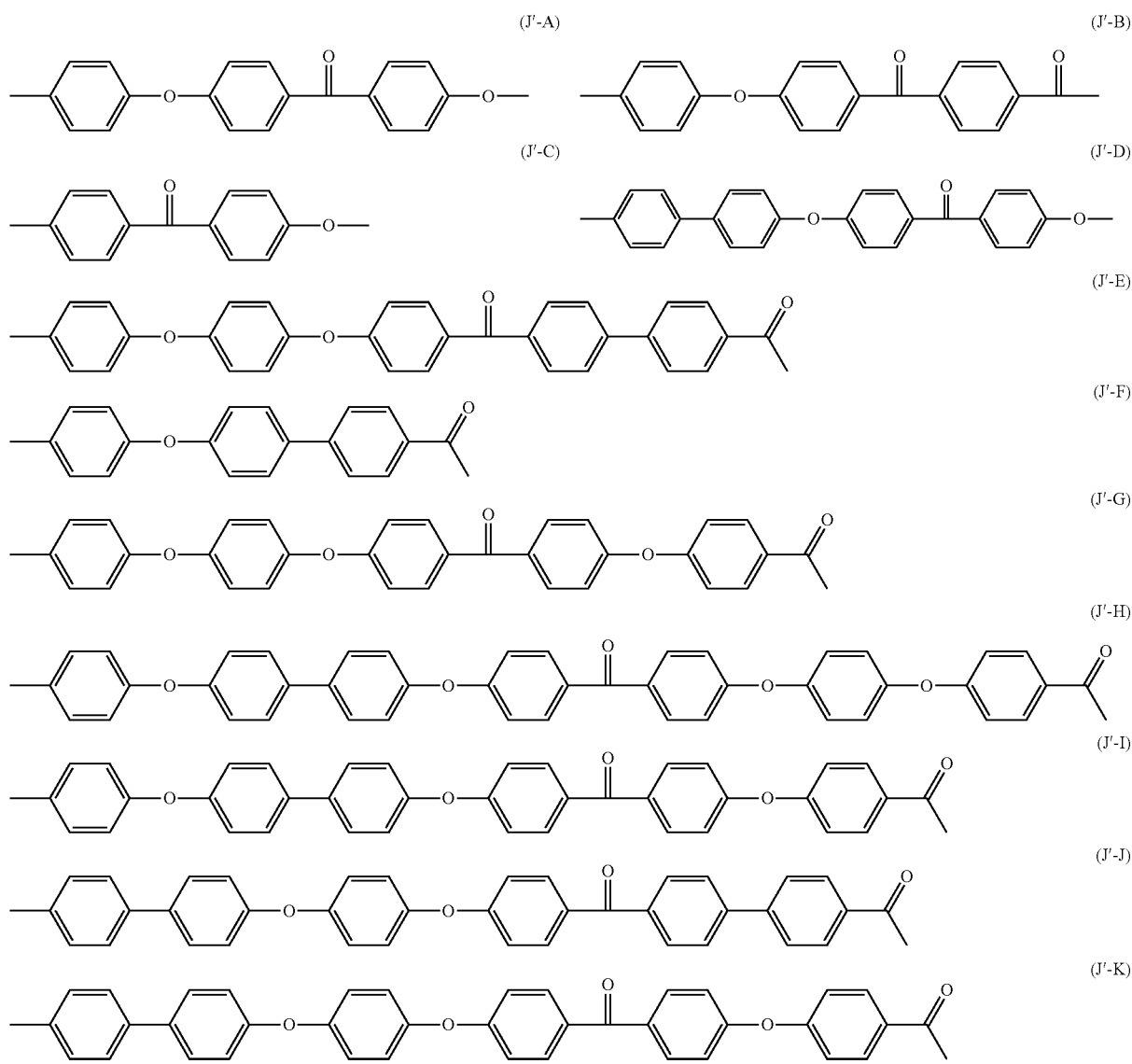

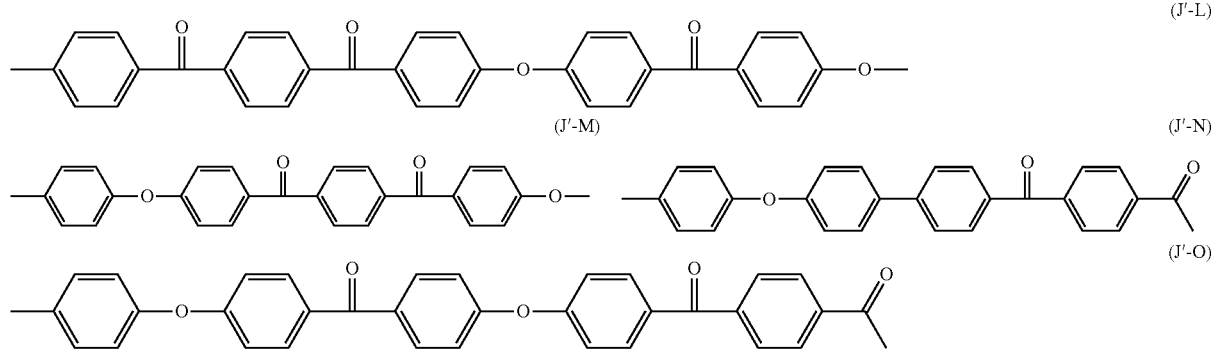

Polymer (PAEK-1) comprises recurring units of formula ($R_a$) as above detailed in an amount of at least 10% moles, preferably 15% moles, more preferably 20% moles, even more preferably at least 50% moles, with respect to all recurring units therein contained.

According to certain preferred embodiments, more than 70%, and more preferably more than 85% moles of the recurring units of polymer (PAEK-1) are recurring units ($R_a$), as above detailed, the complement to 100% moles being generally recurring units ($R_b$), as above detailed.

Still more preferably, essentially all recurring units of polymer (PAEK-1) are recurring units ($R_a$). Most preferably, all recurring units of polymer (PAEK-1) are recurring units ($R_a$). Excellent results are provided by compositions (C) wherein polymer (PAEK-1) is a polymer in which all recurring units are recurring units ($R_a$), as above detailed.

As said, polymer (PAEK-1) for use in compositions (C) is a high molecular weight polymer, that is to say a polymer having a weight average molecular weight of at least 10,000, preferably at least 15,000, more preferably 20,000, even more preferably 30,000.

The weight average molecular weight ($M_w$) and the number average molecular weight ($M_n$) can be estimated by gel-permeation chromatography (GPC) calibrated with polystyrene standards.

The weight average molecular weight ($M_w$) is:

$$M_w = \frac{\Sigma M_i^2 \cdot N_i}{\Sigma M_i \cdot N_i}$$

The number average molecular weight ($M_n$):

$$M_n = \frac{\Sigma M_i \cdot N_i}{\Sigma N_i},$$

and the polydispersity index (PDI) is hereby expressed as the ratio of weight average molecular weight ($M_w$) to number average molecular weight ($M_n$).

Polymers (PAEK-1) for use in compositions (C) of the present invention generally have a polydispersity index of less than 2.5, preferably of less than 2.4, more preferably of less than 2.2.

Polymer (PAEK-1) for use in compositions (C) usually possesses a glass transition temperature of at least 140° C., preferably 160° C., more preferably at least 165° C. Glass transition temperature (Tg) can be determined by DSC, according to ASTM D3418.

Polymer (PAEK-1) for use in compositions (C) usually possesses a peak degradation temperature of at least 300° C., preferably at least 330° C., more preferably at least 360° C.

Peak degradation temperature can be determined by TGA, using the procedure described in ASTM E1131.

Polymers (PAEK-1) for use in compositions (C) can be manufactured following the teaching of the aforementioned WO 2013/023997, herein incorporated by reference.

Poly(Biphenyl Ether) Sulfones

For the purposes of the present invention, poly(biphenyl ether) sulfones (herein after "PPSU-1") are aromatic sulfone polymers where at least 50% moles of the recurring units are recurring units of formula ($R_c$):

formula ($R_c$):

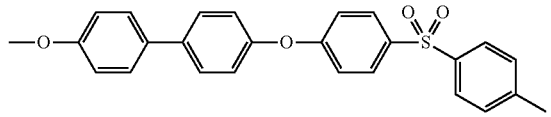

Preferably at least 60% moles, more preferably at least 70% moles, still more preferably at least 80% moles and most preferably at least 90% moles of the recurring units of (PPSU-1) are recurring units ($R_c$).

Recurring units other than units ($R_c$) which can be contained in polymer (PPSU-1) are typically selected from those complying with formula ($R_d$):

$$-Ar^1\text{-}(T'\text{-}Ar^2)_n-O-Ar^3-SO_2-[Ar^4\text{-}(T\text{-}Ar^2)_n-SO_2]_m-Ar^5-O- \quad (R_d)$$

wherein:

$Ar^1$, $Ar^2$, $Ar^3$, $Ar^4$, and $Ar^5$, equal to or different from each other and at each occurrence, are independently an aromatic moiety;

T and T', equal to or different from each other and at each occurrence, are independently a bond or a divalent group optionally comprising one or more than one heteroatom; preferably, T' and T are independently selected from the group consisting of a bond, —$CH_2$—, —C(O)—, —C($CH_3$)$_2$—, —C($CF_3$)$_2$—, —C(=$CCl_2$)—, —$SO_2$—, —C($CH_3$)($CH_2CH_2COOH$)—, and a group of formula:

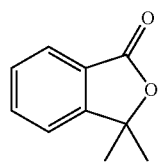

n and m, equal to or different from each other, are independently zero or an integer of 1 to 5.

Recurring units ($R_d$) can be notably selected from the group consisting of those of formulae (S-A) to (S-D) herein below:

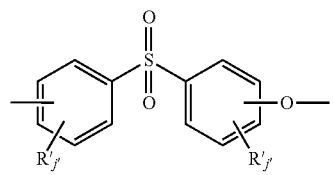 (S-A)

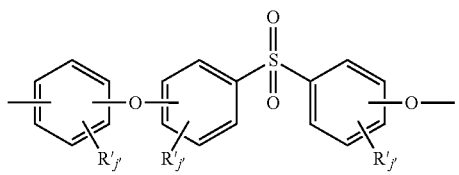 (S-B)

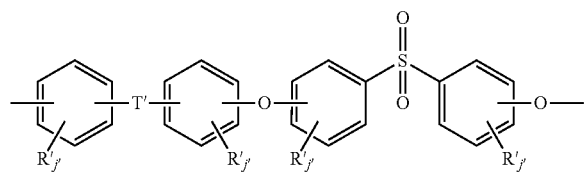 (S-C)

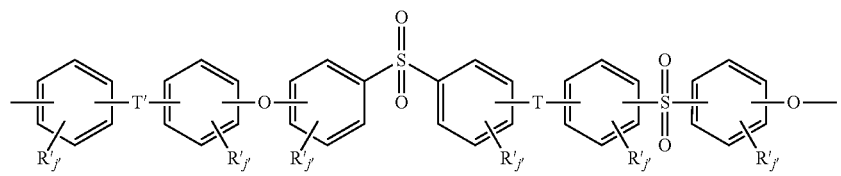 (S-D)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other and at each occurrence, are a bond or a divalent group optionally comprising one or more than one heteroatom; preferably T and T' are independently selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

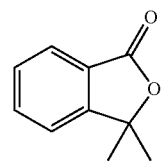

with the proviso that, in recurring units of formula (S-C) in which T' is a bond, at least one of j' is not 0.

Preferred recurring units (R$_d$) may be selected from the group consisting of the recurring units of formulae (i) to (iv) and (j) to (jv) detailed below:

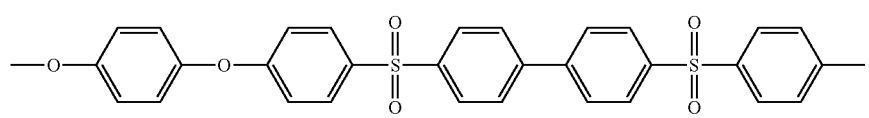 (i)

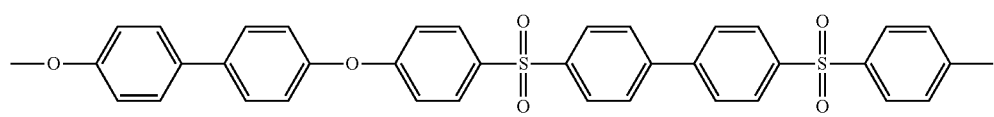 (ii)

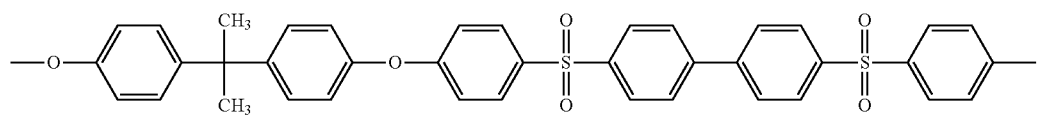 (iii)

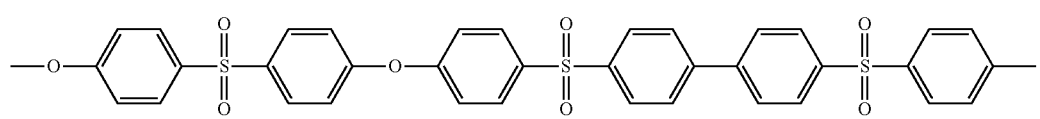 (iv)

-continued (j)
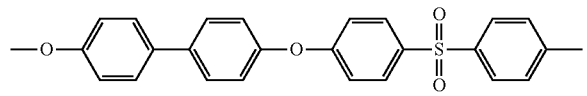

(jj)
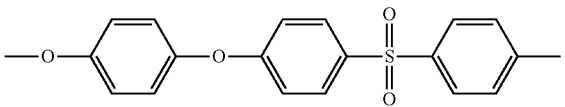

(jjj)
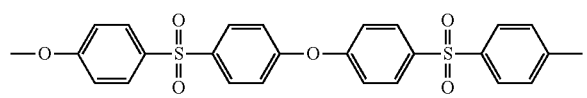

(jv)
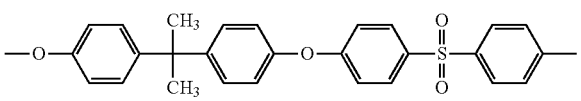

and mixtures thereof.

(PPSU-1) are commercially available and can be manufactured according to methods known in the art.

Excellent results are provided by compositions (C) wherein the (PPSU-1) contains no recurring unit other than recurring units ($R_e$). This polymer is notably available as RADEL® PPSU commercially available from Solvay Specialty Polymers USA, L.L.C. Accordingly, a preferred embodiment of the invention is represented by compositions (C) wherein the (PPSU-1) contains no recurring unit other than recurring units ($R_e$).

Polyetherimides (PEI)

PEI suitable for use in compositions (C) (herein after "PEI-1") and methods for their manufacture are disclosed in U.S. Pat. No. 3,847,867 (GEN ELECTRIC) Sep. 24, 1974 and in U.S. Pat. No. 3,847,867 (GEN ELECTRIC) Nov. 12, 1974, herein incorporated by reference.

Preferred (PEI-1) suitable for use in compositions (C) comprise recurring units of formula ($R_e$):

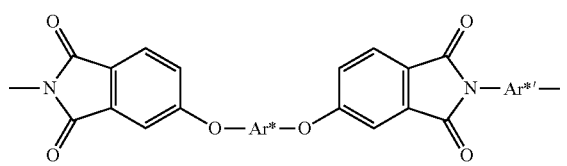

in which Ar* and Ar*', equal to or different from another, are a substituted or unsubstituted monoarylene moiety, such as p-phenylene and m-phenylene, or a diarylene moiety like biphenyl, bisphenol A and bisphenol S. The above formula ($R_e$) is intended to comprise isomers wherein the —O—Ar*—O— moiety is attached to the 3 and 3' positions of the aromatic moieties. Non-limiting examples of substituents of moieties Ar* and Ar*' are independently selected from one or more halogens and/or one or more $C_1$-$C_3$ straight or branched (halo)alkyl groups.

Preferred (PEI-1) are conveniently obtained by reaction of an aromatic bis(ether anhydride) of formula:

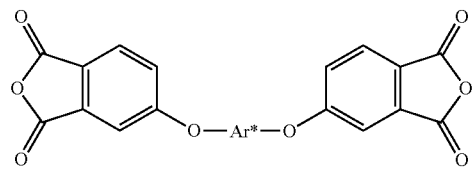

wherein Ar* is as defined above with one or more aromatic diamines $H_2N$—Ar—$NH_2$ wherein Ar' is as defined above. Preferred (PEI-1) may also comprise recurring units derived from other aromatic anhydrides, such as benzene tetracarboxylic acid dianhydride, benzophenone tetracarboxylic acid anhydride, diphenylether tetracarboxylic acid dianhydride, naphthalene tetracarboxylic acid anhydride. Such other units can be comprised in an amount up to 50% mole, preferably up to 25% mole.

(PEI-1) for use in compositions (C) are commercially available.

Preferred (PEI-1) for use in compositions (C) comprise repeating units of formula ($R_e$-1):

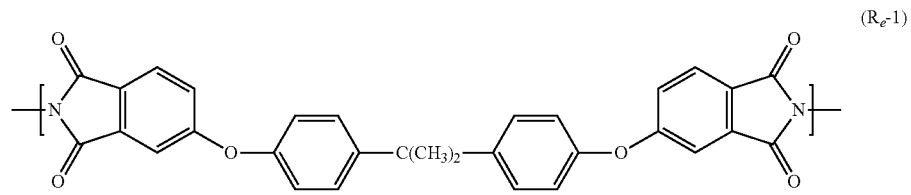

Such (PEI-1) are commercially available from Sabic under the tradename Ultem®.

Optional Ingredients in Compositions (C)

Further to a (PAEK-1) and a (PPSU-1) and/or a (PEI-1), compositions (C) may comprise additional ingredients, for example viscosity modifiers, lubricants, colorants, fillers, thermal stabilizers, UV stabilizers, antioxidants flame retardants, conductivity additives and the like, with the proviso that said other ingredients are inert and do not impair the transparency and the mechanical properties of the compositions. Said other ingredients can be contained in an amount ranging from 0.001% to 70% wt with respect to the weight of the composition. A person skilled in the art will be able to select the kind and amount of said additional ingredients on the basis of common general knowledge.

Amounts of Ingredients in Compositions (C)

Compositions (C) typically comprise:
from 10% to 90% wt of a (PAEK-1); and
from 90% to 10% wt of a (PPSU-1) and/or (PEI-1).
Preferably, compositions (C) comprise:
from 30% to 70% wt of a (PAEK-1); and
from 70% to 30% wt of a (PPSU-1) and/or (PEI-1).
More preferably, compositions (C) comprise:
50% wt of a (PAEK-1) and
50% wt of a (PPSU-1) and/or (PEI-1).

In a first embodiment, compositions (C) are compositions (C-1) comprising:
a (PAEK-1) and
a (PPSU-1).

In second embodiment, compositions (C) are compositions (C-2) comprising:
a (PAEK-1) and
a (PEI-1).

In a third embodiment, compositions (C) are compositions (C-3) comprising:
a (PAEK-1) and
a (PPSU-1) and a (PEI-1).

Preferred are compositions (C-1) and (C-2) as defined above; most preferred are compositions (C-1) as defined above.

Preferably, in compositions (C-1)-(C3), (PAEK-1) comprises only repeating units $(R_a-1)$-$(R_a-3)$ as defined above, most preferably only repeating units $(R_a-1)$ as defined above; (PPSU-1) comprises only recurring units $(R_e)$ as defined above and (PEI-1) comprises only repeating units $(R_e-1)$ as defined above.

Compositions (C) can be manufactured by blending a (PAEK-1), a (PPSU-1) and/or a (PEI-1) as defined above in selected amounts and, optionally, additional ingredients as defined above, followed by processing according to methods known in the art, such as melt processing (including injection moulding, extrusion moulding, compression moulding, blow moulding and rotational moulding) and solution processing.

As it will be clearer from the description of embodiments reported in the following section, despite their structural differences a (PAEK-1), a (PPSU-1) and/or a (PEI-1) have been surprisingly found to be completely miscible, as demonstrated by the fact that all tested compositions (C) showed a single Tg and that no phase separation occurred. All compositions were transparent and showed a lower processing temperature than that of each single polymer.

At the same time, compositions (C) are stiff and hard; in particular, mechanical tests carried out on compositions (C-1) showed that such compositions are stiffer and harder than (PPSU-1) alone.

Thanks to such advantages, compositions (C) can be conveniently used for the manufacture of shaped articles like membranes, films and sheets and three-dimensional moulded parts wherein it is necessary to combine good mechanical properties and transparency.

Non-limitative examples of shaped articles which can be manufactured from compositions (C) using different processing technologies are generally selected from the group consisting of melt processed films, solution processed films (porous and non-porous films, including solution casted membranes, and membranes from solution spinning), melt process monofilaments and fibers, solution processed monofilaments, hollow fibers and solid fibers, and injection and compression molded objects.

As far as membranes are concerned, compositions (C) of the invention are particularly suitable for manufacturing membranes intended for contact with aqueous media, including body fluids; thus, shaped articles which can be manufactured from compositions (C) are advantageously membranes for bioprocessing and medical filtrations, including hemodialysis membranes, membranes for food and beverage processing, membranes for waste water treatment and membranes for industrial process separations involving aqueous media. From an architectural perspective, membranes manufactured from compositions (C) may be provided under the form of flat structures (e.g. films or sheets), corrugated structures (such as corrugated sheets), tubular structures, or hollow fibers; as far as pore size is concerned, a full range of membranes (non-porous and porous, including for microfiltration, ultrafiltration, nanofiltration, and reverse osmosis) can be advantageously manufactured from compositions (C); pore distribution can be isotropic or anisotropic.

Shaped articles manufactured from compositions (C) can be, as above mentioned, under the form of films and sheets. These shaped articles are particularly useful as specialized optical films or sheets, and/or suitable for packaging.

Further, shaped articles manufactured from compositions (C) can be three-dimensional moulded parts. Among fields of use wherein such injection moulded parts can be used, mention can be made of healthcare field, in particular medical and dental applications, wherein shaped articles made from compositions (C) of the invention can advantageously be used for replacing metals, glass and other traditional materials in single-use and reusable instruments and devices.

Thus, a further object of the present invention are shaped articles manufactured from compositions (C).

Another object of the invention is a method for coating substrates comprising using compositions (C). In particular, compositions (C) can be applied to metals in order to prevent corrosion.

The choice of substrates is not particularly limited. Such coatings may be useful for protecting substrates such as notably metals such as steel, in particular stainless steel, aluminium, copper, and other metals in applications such as food and beverage can coatings, marine-hull protection, aerospace, automotive, wire coating, and electronics and plastics. The composition (C) coating could also be applied to other substrates including glass and carbon fiber cloths, for example, that could be used, after the removal of the solvent, as thermoplastic composites useful in aerospace and automotive applications to replace metal parts.

According to one embodiment of the invention, the method comprises dissolving a composition (C) as defined above in at least one liquid medium, wherein said composition (C) is at least partially dissolved in a liquid medium.

For the purpose of the invention, the term "liquid medium" is intended to denote a medium which is available in liquid state at a temperature of 25° C. and at atmospheric pressure.

By the term "dissolved" is meant that the composition (C) is present in solubilised form in the liquid medium.

In this embodiment of the present invention, composition (C) in said liquid medium is substantially in a dissolved form, that is to say that more than 90% wt, preferably more than 95% wt, more preferably than 99% wt is dissolved in the liquid medium.

The liquid medium according to this embodiment preferably comprises a solvent selected among active solvents for polymers (PAEK-1), (PPSU-1) and/or (PEI-1). An active solvent for such polymers is a solvent which is able to dissolve at least 5% wt of polymers (PAEK-1), (PPSU-1) and/or (PEI-1) (with respect to the total weight of the final solution) at a temperature of 25° C. and at atmospheric pressure.

Active solvents which can be used in this embodiment are notably dimethylformamide (DMF), dimethylacetamide (DMAC), dimethylsulfoxide (DMSO), N-methyl-2-pyrrolidone (NMP) and the like.

The liquid medium of this embodiment can further comprise one or more of intermediate and/or latent solvents for the polymers (PAEK-1), (PPSU-1) and/or (PEI-1). Nevertheless, the liquid medium will preferably comprise a major amount of the active solvent, most preferably consist essentially of the active solvent. Liquid media might comprise impurities or other ingredients (e.g. additives, stabilizers . . . ) that do not significantly modify the properties of the liquid medium.

The liquid composition (C) comprising polymers (PAEK-1), (PPSU-1) and/or (PEI-1) [herein after "composition $(C_L)$"] used in this embodiment advantageously comprises polymers (PAEK-1), (PPSU-1) and/or (PEI-1), as described above, in an amount equal to or greater than 0.5 wt. %, preferably equal to or greater than 5 wt. %, more preferably equal to or greater than 15 wt. %, most preferably equal to or greater than 20 wt. %, relative to the total weight of the liquid composition.

If desired, composition $(C_L)$ can further comprise other conventional ingredients used for coatings such as notably viscosity modifiers, lubricants, colorants, filers, stabilizers, and the like with the proviso that said other ingredients are inert and not interact substantially with the polymers (PAEK-1), (PPSU-1) and/or (PEI-1).

Coating techniques are not particularly limited. All standard coating techniques suitable for coating compositions comprising a liquid medium can be suitable to this aim. Standard coating techniques include, but are not limited to, film coating, spray coating, curtain coating, casting, coil coating, roller coating, gravure coating, reverse roll coating, dip coating, spray coating, blade coating and the like.

Techniques particularly adapted for coating substrates with composition $(C_L)$ are notably roller coating, dip coating, spray coating, blade coating.

The coating method described herein further comprises drying the layer of liquid composition $(C_L)$ coated onto the substrate. Drying enables substantial removal of the liquid medium. Drying can be effected at any temperatures, from room temperature onward.

The coating method preferably comprises submitting the layer comprising composition $(C_L)$ to a thermal treatment at a temperature of at least 150° C., preferably at least 200° C., more preferably from 200 to 350° C. Thermal treatment can be effected simultaneously, or alternatively, or further in addition to drying.

Should the disclosure of any patents, patent applications, and publications which are incorporated herein by reference conflict with the description of the present application to the extent that it may render a term unclear, the present description shall take precedence.

The invention will be disclosed in greater detail by means of non-limiting examples in the following section.

Description of Embodiments

Materials and Methods

Radel® 5800 PPSU [herein after (PPSU-$1_A$)] is commercially available from Solvay Specialty Polymers USA, LLC.

Ultem® PEI [herein after (PEI-$1_A$)] is commercially available from Sabic.

The (PAEK-1) polymers herein after referred to as (PAEK-$1_A$) and (PAEK-$1_B$) were prepared following the method disclosed in Example 1 of WO 2013/023997, with the difference that certain reagents were used in the amounts indicated here below:

for (PAEK-$1_A$): molar ratio of [isosorbide]/[DFBP]/[$K_2CO_3$]=1.000/1.015/2.000 in target 36 wt % polymer solution;

for (PAEK-$1_A$): molar ratio of [isosorbide]/[DFBP]/[$K_2CO_3$]=1.000/1.015/1.250 in target 30 wt % polymer solution wherein DFBP stands for 4,4'-difluorobenzophenone.

DSC analyses were carried out according to ASTM D3418.

TEM analyses were carried out with a Philips CM12 Transmission Electron Microscopy. And all specimens were sectioned with a diamond knife into a thickness of ~50 nm, using ultra microtome technique by Leica EM UC7 & EM FC Ultramicrotome.

Preparation of (PPSU-$1_A$)/(PAEK-$1_A$) Compositions and Tests (PPSU-$1_A$)/(PAEK-$1_A$) compositions were prepared from pure Radel®5800 (PPSU-$1_A$) and (PAEK-$1_A$), combining the two polymers by weight percent, as indicated in the table below; the pure polymers and the compositions were extruded by DSM Xplore® twin screw extruder under the following processing conditions:

barrel temperature=380° C. for the PPSU-$1_A$ and 360° C. for the compositions and (PAEK-1);

melt temperature=352° C. for the PPSU-$1_A$, 333° C. for the compositions and (PAEK-1);

RPM=100;

residence time about 2 min.

After extrusion, the molten polymers and compositions were collected for DSC and TEM to evaluate the miscibility of the two polymers. All extrudates were transparent.

DSC runs were carried out on the extrudates to determine the glass transition temperature of the (PPSU-$1_A$)/(PAEK-$1_A$) compositions and of the pure (PPSU-$1_A$) and (PAEK-$1_A$) polymers. DSC thermograms showed a single glass transition temperature. Also TEM micrographs were taken from the polymer compositions and all micrographs showed no phase separation.

The following table reports the wt percentages of the polymers in the extrudates and the results of the DSC analyses (Tg).

TABLE 1

| | PPSU-$1_A$ | PPSU-$1_A$/PAEK-$1_A$ 90/10 | PPSU-$1_A$/PAEK-$1_A$ 70/30 | PPSU-$1_A$/PAEK-$1_A$ 50/50 | PPSU-$1_A$/PAEK-$1_A$ 30/70 | PAEK-$1_A$ |
|---|---|---|---|---|---|---|
| % of Radel® 5800 PPSU in the extrudate | 100 | 90 | 70 | 50 | 30 | 0 |

TABLE 1-continued

|  | PPSU-$1_A$ | PPSU-$1_A$/PAEK-$1_A$ 90/10 | PPSU-$1_A$/PAEK-$1_A$ 70/30 | PPSU-$1_A$/PAEK-$1_A$ 50/50 | PPSU-$1_A$/PAEK-$1_A$ 30/70 | PAEK-$1_A$ |
|---|---|---|---|---|---|---|
| % of (PAEK-$1_A$) polymer in the extrudate | 0 | 10 | 30 | 50 | 70 | 100 |
| Tg, ° C. | 220.7 | 216.9 | 207.2 | 198.6 | 188.7 | 178.3 |

Additionally, (PPSU-$1_A$)/(PAEK-$1_A$) 50/50 compositions were compression molded at 270° C. for 30 minutes to make 4"×4" plaque and later type V-tensile bars were prepared from this plaque. The type V bars were tested and the following table summarizes the mechanical properties of Radel® 5800 PPSU and Radel® 5800 PPSU/(PAEK-$1_A$) 50/50 composition.

TABLE 2

|  | Unit | Radel ® 5800 PPSU | Radel ® 5800 PPSU/(PAEK-$1_A$) 50/50 blend |
|---|---|---|---|
| Modulus of elasticity | ksi | 310 ± 6.8 | 359 ± 30.7 |
| Tensile elongation at yield | % | 8.4 ± 0.09 | 8.5 ± 0.11 |
| Tensile strength at break | psi | 6840 ± 321 | 8110 ± 275 |
| Tensile strength at yield | psi | 11100 ± 154 | 11800 ± 52 |
| Type V tensile - Testing speed | in/min | 0.5 | 0.5 |

It stems from the results of the mechanical tests that the Radel® 5800 PPSU/(PAEK-$1_A$) composition is stronger and stiffer than Radel® 5800 PPSU alone.

Preparation of (PAEK-1)/PEI Compositions and Tests (PEI-$1_A$)/(PAEK-$1_B$) compositions were prepared from Ultem® 1000 PEI and (PAEK-$1_B$), combining the two polymers by weight percent, as indicated in the following table; the pure polymers and the compositions were extruded by DSM Xplore® twin screw extruder under the following processing conditions:

barrel temperature=360° C.;

RPM=100;

residence time: about 2 min.

After extrusion, the molten polymers and compositions were collected for DSC and TEM to evaluate the miscibility of two polymers. DSC analyses were carried out to determine the glass transition temperature for the (PEI-$1_A$)/(PAEK-$1_B$) compositions and for each pure polymer. DSC thermograms showed a single glass transition temperature in the compositions and the table below reports the Tg values. Also TEM micrographs were taken from the compositions and all micrographs showed no phase separation. Single Tg scaling in the compositions and no visible microstructure in TEM suggest good miscibility.

TABLE 3

|  | PEI-$1_A$ | PEI-$1_A$/PAEK-$1_B$ | PEI-1A/PAEK-$1_B$ | PEI-$1_A$/PAEK-$1_B$ | PAEK-$1_B$ | PEI-$1_A$/PAEK-$1_B$ |
|---|---|---|---|---|---|---|
| wt % of Ultem ® PEI in the extrudate | 100 | 90 | 70 | 50 | 30 | 0 |
| wt % of (PAEK-$1_B$) in the extrudate | 0 | 10 | 30 | 50 | 70 | 100 |
| Tg, ° C. | 214.0 | 216.0 | 207.6 | 201.0 | 194.6 | 174.9 |

The invention claimed is:

1. A composition comprising:
   (a) a polyarylene ether ketone (PAEK-1) comprising recurring units of formula:
   ($R_a$):

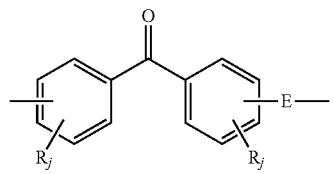

wherein:
   E is selected from the group consisting of:

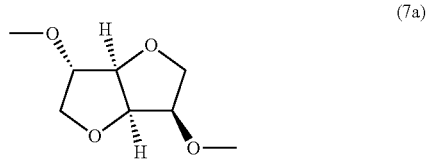
(7a)

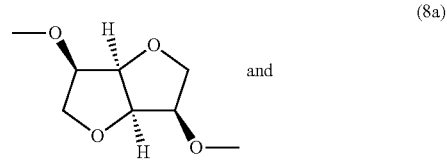
and
(8a)

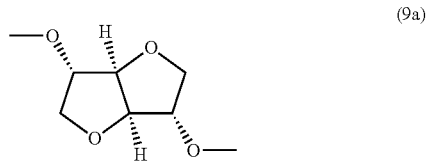
(9a)

each of R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j is zero or is an integer from 1 to 4; and at least one polymer selected from:

(b) a poly(biphenyl ether) sulfone (PPSU-1) comprising repeating units of formula ($R_c$):
   formula ($R_c$)

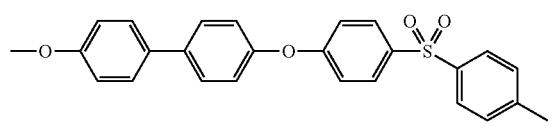

and
(c) a polyetherimide (PEI-1) comprising repeating units of formula ($R_e$):
formula ($R_e$)

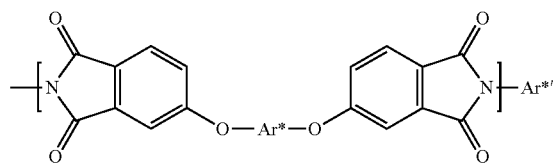

in which Ar* and Ar*', equal to or different from one another, are monoarylene or diarylene moieties, optionally substituted with one or more halogens and/or $C_1$-$C_3$ straight or branched (halo)alkyl groups,
wherein the composition has a single glass transition temperature measured by DSC according to ASTM D3418.

2. The composition of claim 1, wherein the (PAEK-1) comprises recurring units independently selected from:
units of formula ($R_a$-1):

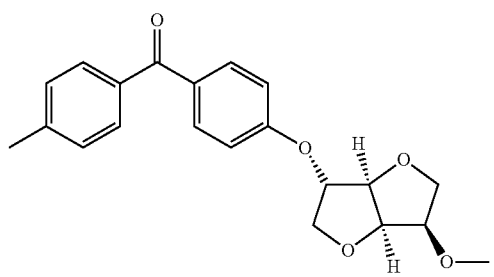

units of formula ($R_a$-2):

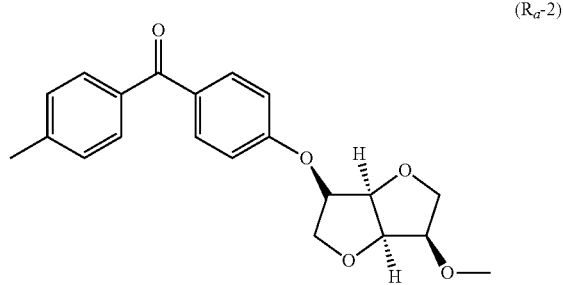

units of formula ($R_a$-3):

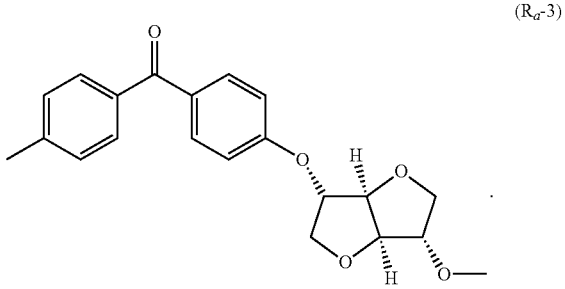

3. The composition of claim 2, wherein the (PAEK-1) further comprises recurring units ($R_b$) selected from the group consisting of formulae (J-A) to (J-O):

(J-A)

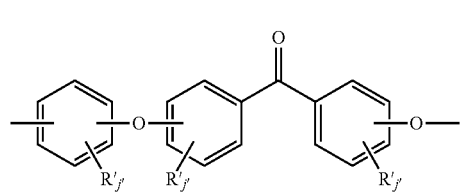

(J-B)

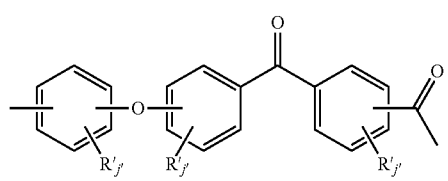

(J-C)

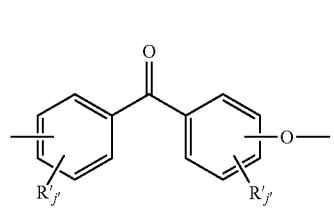

(J-D)

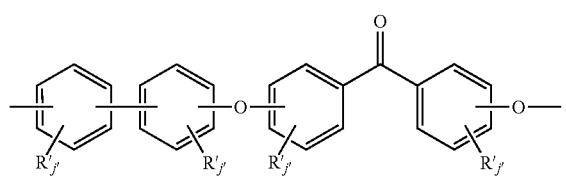

-continued
(J-E)
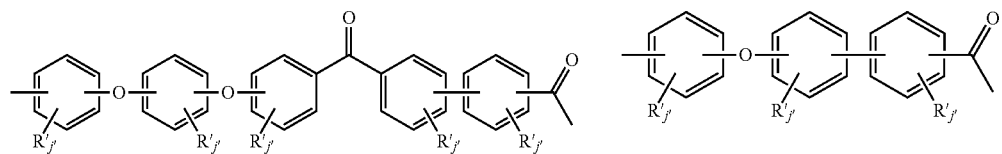
(J-F)
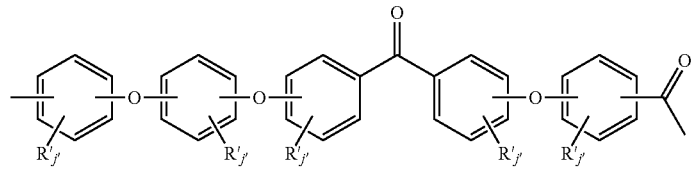
(J-G)
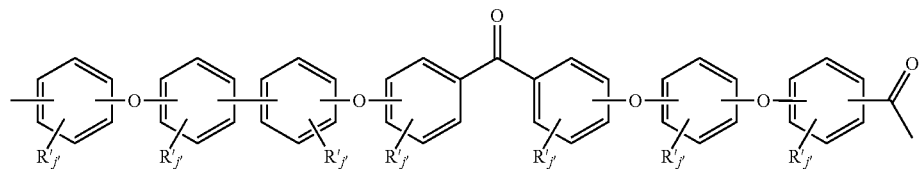
(J-H)
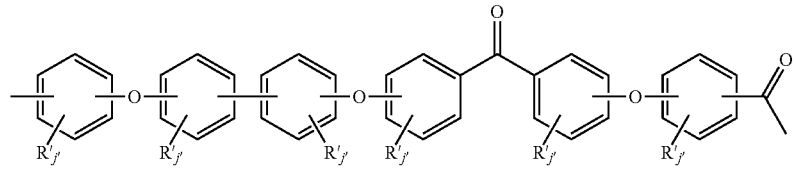
(J-I)
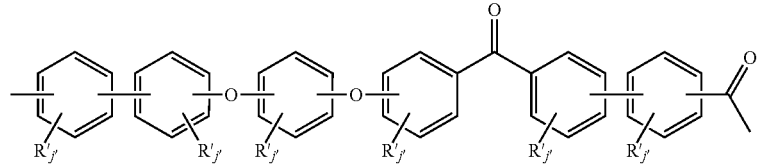
(J-J)
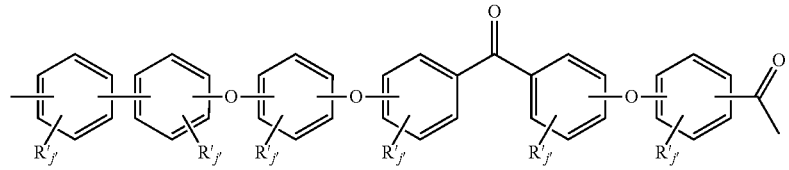
(J-K)
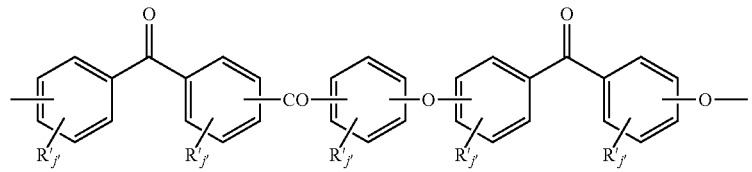
(J-L)
(J-M)
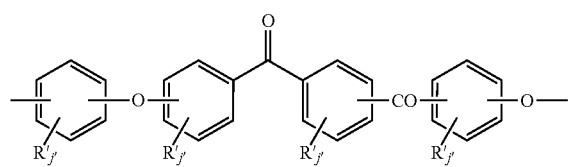
(J-N)
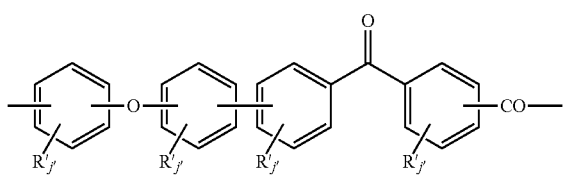

(J-O)

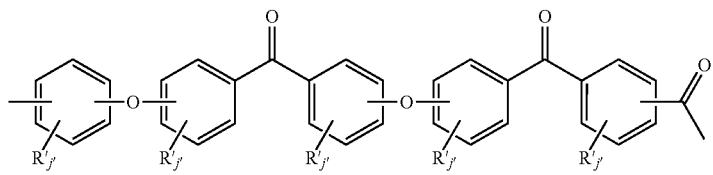

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

4. The composition of claim 2 wherein the (PAEK-1) comprises only repeating units of formula ($R_a$-1):
formula ($R_a$-1)

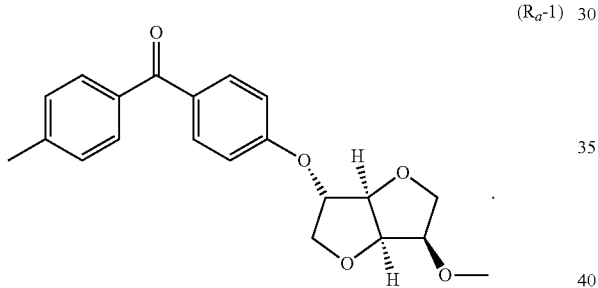

5. The composition of claim 1, wherein the (PPSU-1) is an aromatic sulfone polymer where at least 50% moles of the recurring units are recurring units of formula ($R_c$):
formula ($R_c$)

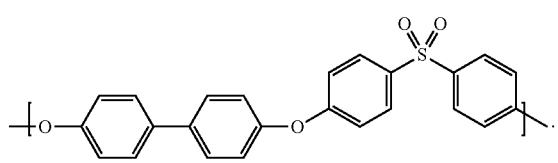

6. The composition of claim 3, wherein the (PPSU-1) further contains recurring units selected from those complying with formula ($R_d$):

—Ar$^1$-(T'-Ar$^2$)$_n$—O—Ar$^3$—SO$_2$—[Ar$^4$-(T-Ar$^2$)$_n$—SO$_2$]$_m$—Ar$^5$—O— ($R_d$)

wherein:
Ar$^1$, Ar$^2$, Ar$^3$, Ar$^4$, and Ar$^5$, equal to or different from each other and at each occurrence, are independently an aromatic moiety;
T and T', equal to or different from each other and at each occurrence, are independently a bond or a divalent group selected from a bond, —CH$_2$—, —C(O)—, —C(CH$_3$)$_2$—, —C(CF$_3$)$_2$—, —C(=CCl$_2$)—, —SO$_2$—, —C(CH$_3$)(CH$_2$CH$_2$COOH)—, and a group of formula:

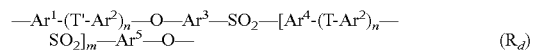

n and m, equal to or different from each other, are independently zero or an integer of 1 to 5.

7. The composition of claim 3, wherein the (PPSU-1) comprises only recurring units of formula ($R_c$):
formula ($R_c$)

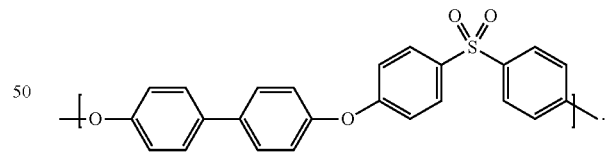

8. The composition of claim 1 wherein the (PEI-1) comprises recurring units of formula ($R_e$-1):
formula ($R_e$-1)

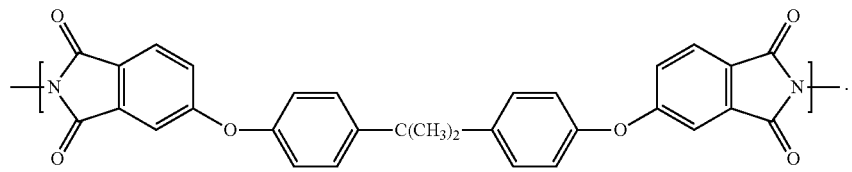

9. The compositions of claim 1, wherein the compositions comprise:
from 10% to 90% wt of the (PAEK-1); and
from 90% to 10% wt of the (PPSU-1), the (PEI-1), or mixtures thereof.

10. A shaped article manufactured from the composition of claim 1.

11. The shaped article of claim 10, said article being selected from membranes, films, sheets, and three-dimensional moulded parts.

12. A method of forming the shaped article of claim 10 which comprises processing the composition, wherein the processing is selected from melt processing, solution processing, or a combination thereof.

13. A method of coating a substrate, said method comprising dissolving the composition of claim 1 in at least one liquid medium and applying the composition on to a substrate.

14. The composition of claim 1, wherein the composition is transparent.

* * * * *